Figures 1, 2:
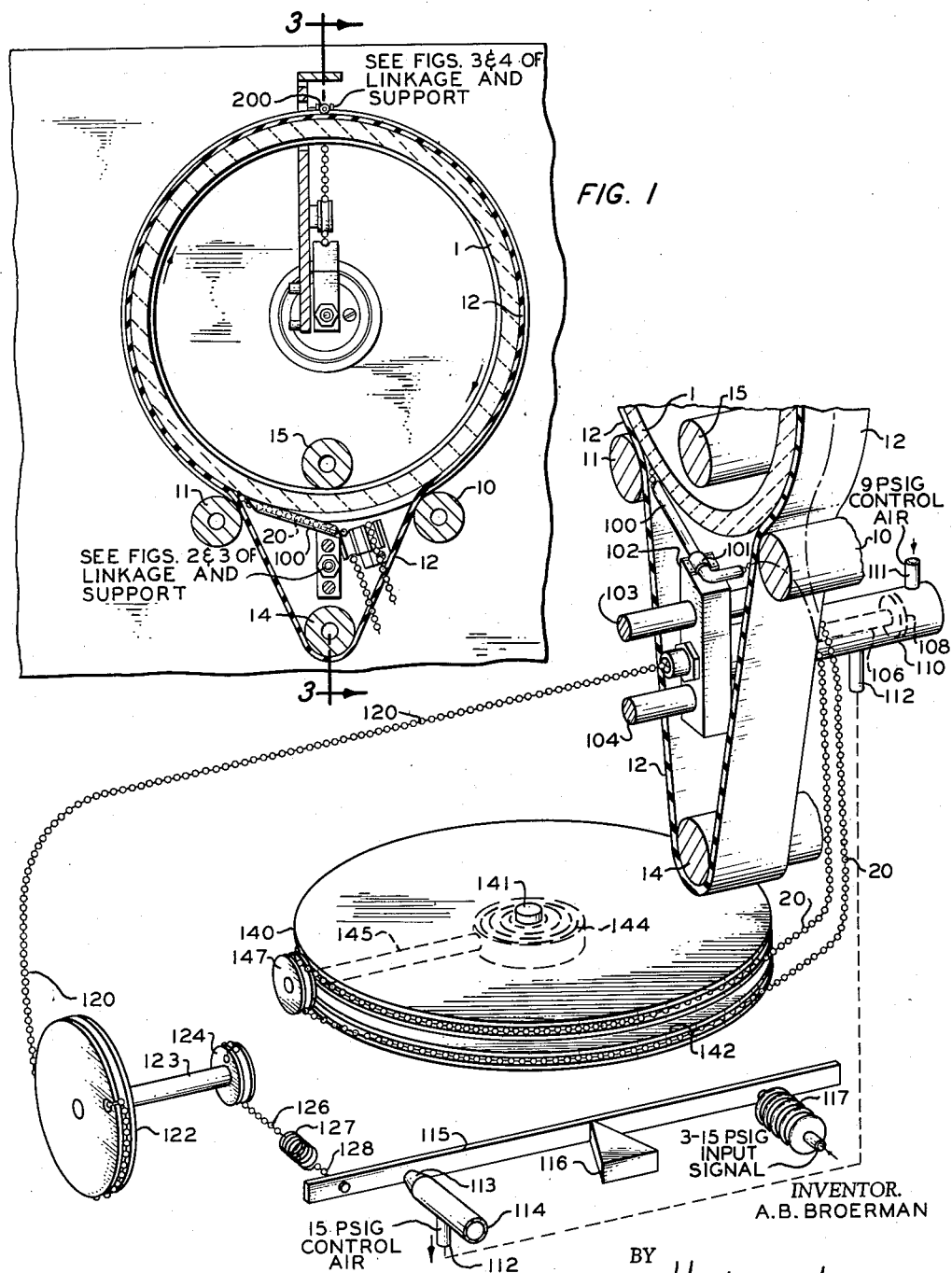

April 18, 1961 A. B. BROERMAN 2,980,126
PROCESS DEAD TIME SIMULATOR
Filed Nov. 6, 1958 3 Sheets-Sheet 1

INVENTOR.
A.B. BROERMAN
BY Hudson & Young
ATTORNEYS

INVENTOR.
A.B. BROERMAN
BY Hudson & Young
ATTORNEYS

April 18, 1961　　A. B. BROERMAN　　2,980,126
PROCESS DEAD TIME SIMULATOR

Filed Nov. 6, 1958　　3 Sheets-Sheet 3

INVENTOR.
A.B. BROERMAN
BY *Hudson & Young*
ATTORNEYS

United States Patent Office 2,980,126
Patented Apr. 18, 1961

2,980,126
PROCESS DEAD TIME SIMULATOR

Arthur B. Broerman, St. Petersburg, Fla., assignor to Phillips Petroleum Company, a corporation of Delaware Filed Nov. 6, 1958, Ser. No. 772,280

20 Claims. (Cl. 137—85)

This invention is a means for storing an analog signal for a period of time. Specifically, this invention is a mechanical means for storing analog signals for a preselected or predetermined time interval.

In automatic control systems such as found in the metallurgical and the chemical industries, transportation lag and/or flow time of materials being processed results in certain types of delay. These delays are lumped under the general term of "dead time." This term, "dead time," is ordinarilly applied to define that time between the adjustment of a controlled variable and the measurements of the results of correction. As noted above, lag due to transportation and flow is a common contributor to the dead time. It has been found that in some control systems where there is a considerable dead time, that there may be a lack of stability in the control loop and/or a low accuracy. Poor stability has been realized when there is a low value of the ratio of the largest system time constant to the dead time of the control loop involved.

It has been proposed, in order to compensate for deficiencies where dead time is an important factor, to delay control signals so that the dead time is simulated in the control system. This is ordinarily done by installing a delaying means in a feedback circuit around a controller and putting in parallel with such means a channel through which present process adjustment signals are fed. When the delayed signal equals the present adjustment signal, the dead time system is considered to have been properly adjusted. This means the control system can anticipate the normal process response to a given process adjustment, i.e. the behavior is as if there is no dead time. There have been various means employed for delaying such signals—electrical filters where delays of only fractions of a second are desired, and tape records where longer delays e.g. 10 minutes) are required. While these may be all right for theoretical studies, and for use in the laboratory, they are not always suitable for employment throughout plants in process control where it is desired to have a simple device, at as low a cost as possible, and preferably of a nature that no special training will be required for its maintenance or understanding of its theory. Moreover, there are many processes having a dead time intermediates these extremes, e.g. in a range from about 1 second to several minutes.

This invention is a dead time simulator for incorporation in a plant process control system. This is a means for storing analog signals continuously by mechanical means. In essence, the mechanism comprises a drum; a belt engaging only a portion of the periphery of the drum; a flexible, continuous member such as a beaded chain; means for placing a portion of the chain between the drum and the belt; and means disposed circumferentially around the drum from the means for placing for following the chain. Appropriate transducing means are included, for converting the analog signals in the form they originally occur to mechanical motion, which in this case is a motion parallel to the axis of the drum by the means for placing. By moving the means for placing across the face of the drum and thereby placing the chain between the belt and the drum, the instantaneous position of the chain on the drum is representative of the instantaneous amplitude of the analog signal thus stored. The rotational speed and diameter of the drum and the location of the means for following the chain determine the amount of dead time. The belt travels with the drum and holds the chain in position until such time as the chain is removed from the drum, i.e. when the stored signal is erased.

Accordingly, it is an object of this invention to provide a dead time simulator comprising mechanical means for storing analog signals continuously. It is also an object of this invention to provide a mechanical dead time simulator wherein the signals are stored by placing a chain between a belt and a drum. Other objects and advantages will become apparent from the following disclosure.

Figure 3:
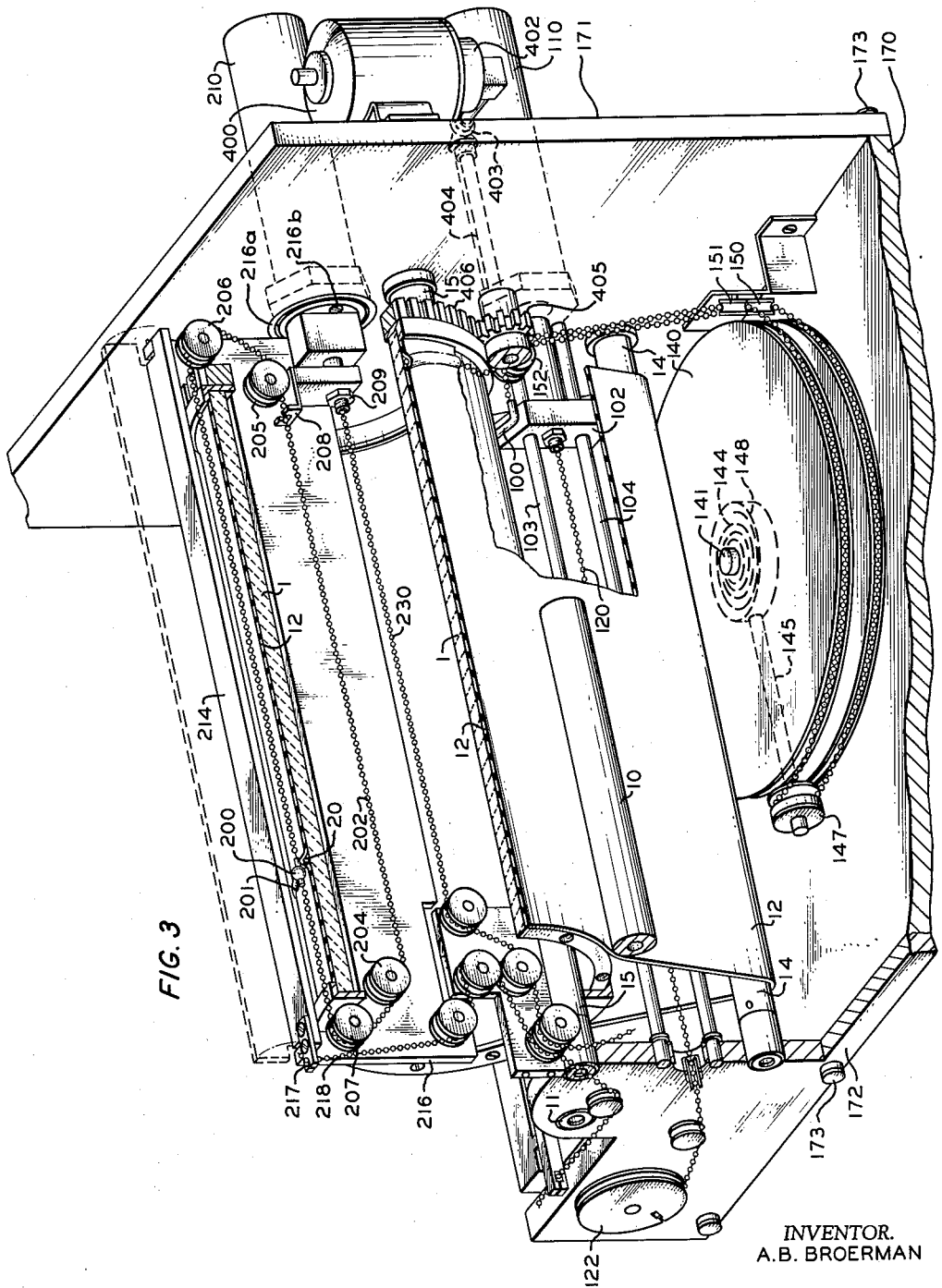
Figure 4:
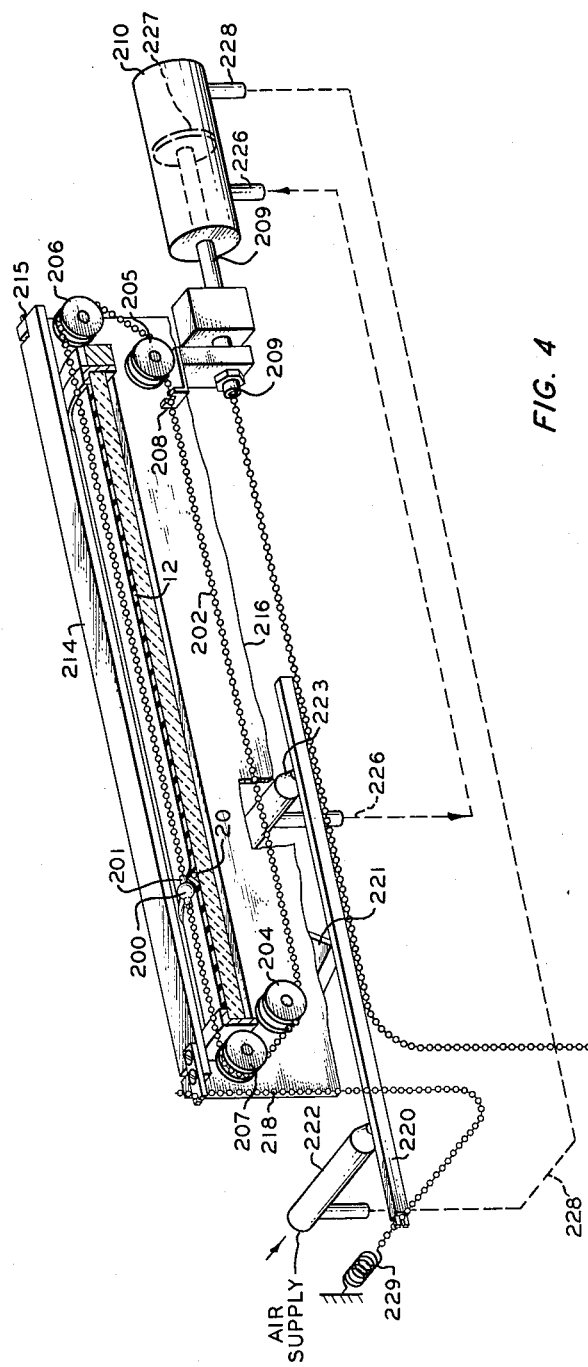
Figure 4:
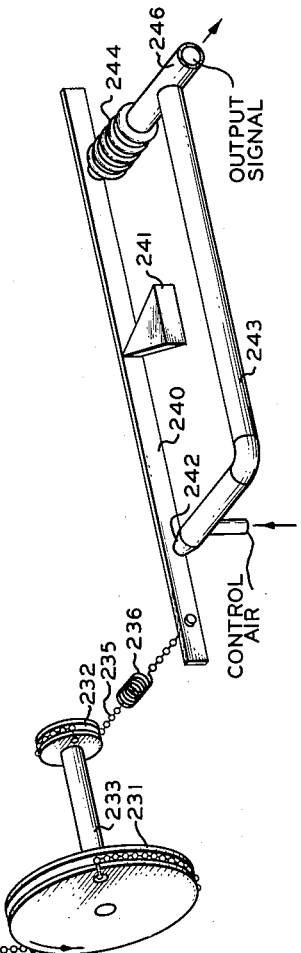

In the drawings: Figure 1 shows an end view of the essential elements of the invention; Figure 2 shows the linkage comprising the means for placing the chain between the drum and the belt; Figure 3 is an isometric sectional view through 3—3 of Figure 1; and Figure 4 illustrates schematically the linkage of the means for following the chain. Throughout the drawings, the same reference numerals refer to the same parts, and modifications of these parts are referred to by primed numerals. It is to be understood that various guide means, e.g. pulleys, are not shown in the drawings, especially Figures 2 and 4, in order to enhance the clarity of the particular drawing.

Figure 1 shows a hollow, cylindrical, centerless drum 1 supported by first and second rollers 10 and 11 which also clamp belt 12 against the drum at the two points where there is kinematic contact. The belt 12 is preferably made of rubber or some equivalent elastomeric composition. It is maintained in tension by a third roller 14. A fourth roller 15 biases the drum 1 against supporting rollers 10 and 11. A funnel 100 distributes the chain 20 axially of the drum 1. Means for supporting and moving funnel 100 are shown in Figures 2 and 3. A means for following comprising a ball 200 follows the chain 20 by tracing the ridge it makes under the belt 12. The details of the linkage and support co-acting with 200 are illustrated in Figures 3 and 4.

In operation of its invention, referral to Figure 1 will illustrate its theory in the best form. Means, such as a synchronous motor 400 (Figure 3), drive the roller 10 which drivingly engages the drum 1 at a point (shown in Figure 3) to rotate it. As drum 1 rotates it carries with it the belt 12. Rolls 10 and 11 keep the belt pressed tightly against the drum as well as supporting the drum. The funnel 100 moves responsive to input analog signals in a direction laterally across the face of the drum, i.e. parallel to the axis drum 1. As the funnel 100 moves it disposes the chain 20 at particular points along the face of the drum 1. Instantaneous positions of the chain 20 relative to one end of the drum, i.e. along the drum axis, represent corresponding instantaneous values of the input signal which has been transduced to mechanical position by means of causing the element 100 to move back and forth. The output signal is read off by the ball 200 following the position of the chain while the chain is held in place between the belt and the drum.

In Figure 2, element 100 is shown as a funnel comprising a tube having an oblique tip, that is held by a bracket 101 on a support block 102. If desired, other securing means than 101 may be used. The support block has two holes therein which reciprocatably engage guide rods 103 and 104, which rods run parallel with the axis of the cylinder and serve to guide the block 102, hence the funnel 100, in parallel paths therewith. A piston rod 106 is bolted, or secured by other means, to the block 102. The rod is connected to piston 108 which is surrounded by cylinder 110. Pneumatic control air from a constant pressure source is supplied to one end of 110 at inlet 111. Variable pressure control air which causes the piston 108, hence the block 102, to reciprocate along the rods is supplied through the conduit 112 to the opposite end of the cylinder. Pneumatic pressure is preferred, although, of course, hydraulic pressure could be used. Conduit 112 connects to a flapper nozzle 113 which is in turn connected by line 114 to a source of control air. A flapper 115 is fulcrumed about knife-edge 116 and the opposite end is engaged by a bellows 117 to which the input signal is provided. This input signal may be obtained by a direct measurement which produces a pneumatic signal or it may be transduced by well known, conventional means to produce a pneumatic signal representative of that originally produced by the measuring element.

A chain 120 is connected by suitable means to the piston rod 106 or, if desired, to the block 102. The chain is secured to a first wheel 122 of a motion reducing apparatus. An axle 123 common to the wheel 122 and a second wheel 124 provides the latter with angular motion equal to that of wheel 122. A chain 126 connects the wheel 124 to spring 127 which is in turn connected to the flapper 115 by a chain 128.

Also shown in Figure 2 is a slack adjuster comprising a first wheel 140, and a shaft 141 on which a second wheel 142 is mounted. Between the two wheels and surrounding the shaft is a coiled spring 144, one end of which biases an arm 145. A small pulley 147 is disposed on the end of the arm.

The construction for the slack adjuster is also shown in Figure 3. It should be evident that the arm and coiled spring are disposed between both wheels and vertically mounted by suitable bearing means on the shaft 141. As seen in Figure 3, the spring 144 connects to a box 148 to which the rod or arm 145 is secured by threaded means.

The operation of the apparatus shown in Fig. 2 will now be described in order to make clear the manner in which an input signal is transduced to position of the chain 20 upon the face of the drum 1. An input signal to bellows 117 expands the bellows and moves the flapper 115 closer to nozzle 113. This builds up the back pressure in the nozzle and this back pressure is applied through line 112 to one end of the pneumatic cylinder 110. Since this is a pressure increase and the pressure in the other end of the cylinder 110 is maintained constant, the piston moves toward the constant pressure end. In the arrangement shown, this will move the block 102, hence the funnel 100, and therefore the chain 20 in the same direction. As viewed in Figure 2, this would mean an increase in pressure would move the chain toward the upper right.

The chain 120 and motion reducing apparatus 122 through 124 constitute part of the feed-back loop. The feed-back motion is transmitted to the spring 127 which is thereby biased in opposition to the direction of motion of the piston. The spring force then moves lever 115 away from nozzle 113, thus reducing the pressure—ultimately to reduce it to 9 p.s.i.g.—and thus balancing the pressures on both sides of the piston 108. While this is going on, the drum 1 is rotating and therefore the belt 20 is moving therewith. This means that the chain is continuously fed into the particular instantaneous positions selected by the foregoing operations. Similar operations in the opposite directions occur if bellows 117 is collapsed by a reduction in pressure.

The slack adjuster is desired in order that a closed or continuous loop of chain can be used. As viewed in Figures 2 and 3, the spring 144 serves to bias the arm 145 in opposition to the direction that the chain assumes upon coming to and going from the small pulley 147. This maintains the chain tight both as it goes to the funnel 100, thence to the position between the belt and the drum, and as it comes from the belt to the pulley 147. As shown in Figure 3, appropriate guide pulleys such as 150 and 151, and 152 are used to guide the chain as necessary. The small guide pulleys are not shown in Figure 2 nor in Figure 4, in order that these figures may be kept as simple as possible.

In Figure 3 is shown the arrangement of elements as described in Figures 1 and 2, and the means for following which are described below in Figure 4. Support for the structure is provided by a base member 170 to which are secured upright bearing blocks 172 and 171 by the bolts 173. The guide rods 103 and 104 are horizontally fixedly supported between the upright members. The cylinder 110 is secured to and supported from upright 171. The roller 15 is supported by suitable bearings at its ends which are in turn disposed in respective upright members 171 and 172. It is to be understood that the rollers 10 and 11 and 14 are likewise supported. Rollers 10 and 11 cannot be completely shown because of the section through which this view is taken. Ball bearings are preferred for rollers 10, 11, 14 and 15.

At the upper portion of Figure 3 is seen part of the linkage for following the position of the chain 20. This is done by providing a means to position the ball 200 half-way up the "hump" or elevation caused by the bead of chain 20 being disposed underneath the belt 12. Variations from this position are, by suitable means to be hereinafter described, used to provide an output signal as well as appropriate repositioning of the ball 200.

As shown, the ball is secured to a sleeve 201 running therethrough, and the assembly of ball and sleeve is affixed to a closed loop of bead chain 202 which is guided over the respective pulleys 204, 205, 206 and 207. A connecting block 208 secures the chain 202 to a piston rod 209 protruding from the cylinder 210.

The foregoing elements are also illustrated in Figure 4, in addition to other related portions of the following or output signal means. The following means further includes a lever 214 extending axially of the drum and journalled at bearing 205 to a support plate 216 which is pivotally secured by bearing 216a between the uprights 171 and 172 so that, upon loosening the securing means the member and all attached apparatus can swing about the center of drum 1. The securing means may comprise a set screw 216b threaded into the plate 216, which when screwed to advance to the right (viewed in Figure 3), engages the bottom of the recess in 171 wherein bearing 216a is disposed, and thus prevents rotation. A chain securing means 217 connects chain 218 to the lever 214.

As better seen in Figure 4, the chain 218 connects to a flapper 220 that is fulcrumed about knife-edge 221. Each end of the flapper is disposed adjacent a nozzle such as respectively, 222 and 223. Back pressure in both 222 and 223 is communicated through respective lines or conduits 228 and 226 to one end of cylinder 210. This yields a more sensitive responding system. A spring 229 biases the lever and chain assembly 220–218.

A chain 230 connects block 208 to a motion reducing mechanism comprising large wheel 231 and small wheel 232 mounted on a common shaft 233. A chain 235 having a spring 236 therein is connected between the smaller wheel and another flapper 240. The latter is fulcrumed at point 241 and is positioned adjacent a nozzle 242. Back pressure from the nozzle is applied through line 243 to a bellows 244, thereby to balance the flapper, and also is transmitted through a line 246 whereby it becomes the output signal from the system.

It is to be noted that pulleys 204, 205, 206, 207 are all mounted on plate 216, as are the journals 214, 215. Piston rod 209, chain 230, and the horizontal portion of chain 218 (Figure 3) lie along the center line of drum 1.

This permits pivoting the entire following means without causing positional displacement of these elements.

As previously stated, the theory of this output system is to maintain the ball 200 half-way up the hump caused by the bead chain underneath the rubber belt 12. This is accomplished by causing the pneumatic cylinder 210 to position the ball 200 laterally on the face of the drum, i.e., move it in an axial direction, whereby its vertical position relative to the drum and the chain is tended to be maintained constant. The apparatus shown in Figures 3 and 4 is designed to provide a means for following the chain, which means can be positioned circumferentially around the drum from the funnel 100. Assume that chain 20 moves to the left as viewed in Figure 3. This causes the ball 200 to rise which in turn lifts the lever 214. As the lever rotates about its journal 215, the chain 218 causes flapper 220 to lift. This lifts the flapper away from nozzle 222 but drives it closer to nozzle 223, which causes the back pressure behind 223 to increase. This pressure increase is transmitted through 226 to one end of the cylinder 210. This in turn causes the piston 227 to move in such a direction as to move the ball 200 to the left, as viewed in Figures 3 and 4, i.e., to move the ball in the same direction that the chains 20 had moved just an instant before. As with the input system, this process goes on while the drum 1 with the belt and chain 20 is rotating.

Inasmuch as differential pressure (from 222 and 223) is employed in driving piston 227, the feed-back for rebalancing is provided by the repositioning of ball 200 with its consequent repositioning of the lever 220. When 220 is repositioned, the pressures in lines 226 and 228 become equal.

The movement of piston 227 is also employed to produce an output signal by transmitting the piston motion through chain 230 and motion reducing mechanism 231—233 to the flapper 240. In the instant case, where the piston 227 had moved toward the right as shown in Figure 4, the flapper is biased away from nozzle 242, thus reducing the tension in spring 236, and causing flapper 240 to move closer to nozzle 242. This increases the output signal which is transmitted through lines 243 and 246 to appropriate devices.

Referring again to Figure 3, there is shown the means for driving the drum and belt. In essence, this comprises a motor and gear train for driving the roller 10. At one end of the roller 10 are disposed gear teeth or other suitable means for engaging one portion of the drum 1 thereby to drive the latter. Radial gear forces are compensated for by the roller 15 (Figure 1) which urges the drum 1 down towards both roller 10 and 11. In this sense the roller 15 can be viewed as a biasing means. It is desired to use the structure shown in Figure 1 and the driving means as shown in Figure 3 so that the means for following, mounted on plate 216 as described above, can be rotated about the center of the drum without disturbing the drum itself. As shown in Figure 3, an electric motor 400 (preferably synchronous) drives a gear train comprising transmission 402 and a set of bevel gears 403. The bevel gears are connected through appropriate coupling means and a shaft 404 to the roller 10. The latter has gear teeth 405 thereon which engage gear teeth 406 on the drum 1.

In operation of the foregoing apparatus, the first adjustment is to swing the plate 216 relative to its supports so that the following means 200 is disposed far enough away from the funnel 100 so that the travel time of the chain between these two points plus lag of the assemby is equal to the dead time. For the sake of simplicity, the center about which 216 rotates should be the center of rotation of the drum 1. It should be noted that, by reason of employment of the bead chain, no torsion is caused to be stored in the chain by such adjustment. The motor 400 is started and the drum is permitted to reach its normal operating speed. When an input signal arrives at the bellows 117, the linkage of Figure 2 positions the funnel 100, hence the chain 20 at a point along the axis of the drum 1 which is representative of the amplitude of said input signal. The co-action of the roller 10, the elastomeric belt 12, and the rigid drum 1 (the latter being held in place by the roller 15) all serve to pull the chain through funnel 100 and to hold the chain in a vise-like grip from this point around to roller 11. The belt being in tension, the chain gets no opportunity to move out of position until it reaches the exit point adjacent roller 11 (see Figures 1 and 2). Somewhere in the path of travel from roller 10 to roller 11, the position of the particular part of the bead chain that represents the input signal is sensed by the ball 200. As explained with reference to Figures 3 and 4, appropriate mechanism is operated to maintain the ball in position and in so doing to provide an output signal which appears at the line 246. It is understood that it has taken the amount of time equal to the dead time to produce this output signal from the input signal.

It should be noted that the belt rigidity between the spaced beads on the chain 20 render it possible to give the effect of a continuous member, such as a wire without introducing any irregularities or unnecessary bumpiness in the operation of the ball 200 and the rest of the following means.

In one specific embodiment of this invention which has been constructed, a drum approximately 6 inches in diameter and rotating at 1 r.p.m. permitted a dead time signal storage of about ¾ minute.

While I have disclosed my invention with reference to certain specific embodiments, it is not my intention to be limited only to those means shown for carrying them out in the accompanying specification and drawings, but to include as my invention all those modifications thereto, and equivalence of the apparatus shown therein which are presently known to those skilled in the art.

I claim:

1. A dead time simulator comprising a drum; a belt engaging a portion of the circumference of said drum; a flexible member; means engaging a portion of said member for placing another portion of said member between said drum and said belt; means adjacent said drum disposed circumferentially away from said means for placing, for following said member as placed between said belt and said drum.

2. In a dead time simulator, apparatus for storing signals for a time interval comprising a drum; a belt engaging a portion of the circumference of the drum; a continuously removable member adapted to be placed between said belt and said drum upon the portion of said drum covered by said belt; and means for placing said member between said belt and said drum.

3. The simulator of claim 2 further including means for rotating said drum.

4. A dead time simulator according to claim 2 wherein said member is an endless loop.

5. A dead time simulator according to claim 2 wherein said member comprises a beaded chain.

6. The simulator of claim 2 wherein said drum comprises a centerless drum.

7. The simulator of claim 6 further including means for rotating said centerless drum.

8. The simulator of claim 2 further comprising a centerless drum; means for supporting and driving said centerless drum; and means for maintaining tension in said belt while maintaining said belt in contact with a portion of the circumference of said centerless drum.

9. The simulator of claim 8 wherein said means for supporting and driving comprise first and second rollers disposed beneath said drum, one of said rollers having means for driving by engaging said drum, and a power source connected to said one roller.

10. The simulator according to claim 8 wherein said means for maintaining tension while maintaining contact comprises first and second rollers and spaced apart from each other disposed with said belt between each of them and said drum; means for supporting said rollers to thereby urge said belt against the circumference of said drum; and a third roller disposed along said belt between said first and second rollers and supporting a portion of said belt out of contact with said drum; whereby a first portion of said belt is maintained in tensioned engagement with said drum between said first roller and said second roller and a second portion of said belt is maintained in such tension and out of contact with said drum by said third roller.

11. The simulator according to claim 10 wherein said first and second rollers comprise said means for supporting and driving.

12. In a dead time simulator apparatus for storing signals for a time interval comprising a drum; a belt engaging a portion of the circumference of said drum; a flexible member; means having a portion thereof guiding said member, and responsive to input signals, for moving in a path parallel to the axis of said drum and immediately adjacent to the circumference of said drum, whereby said member is placed between said belt and said drum at a position that is representative of the instantaneous value of such input signals.

13. A dead time simulator according to claim 9 wherein said means for placing comprises a funnel through said member is threaded.

14. A dead time simulator according to claim 9 wherein said means for moving comprises a cylinder having a piston therein, a linkage connected between said piston and said means for placing to move the latter in a linear path, and means for connecting said cylinder to a source of input signals.

15. In a dead time simulator apparatus for storing signals for a time interval comprising a drum; a belt engaging a portion of the circumference of the drum; a flexible member; means for placing said member between said belt and said drum; means adjacent said drum disposed circumferentially away from said means for placing, for contacting the position of said member where the latter is disposed between said belt and said drum; and means, responsive to said means for contacting, for producing a signal representative of the instantaneous axial position of said member on the circumference of said drum.

16. In a dead time simulator apparatus for storing signals for a time interval comprising a drum; a belt engaging a portion of the circumference of the drum; a flexible member; means for placing said member between said belt and said drum; means adjacent said drum disposed circumferentially away from said means for placing, for following the position of said member where the latter is disposed between said belt and said drum; means for moving said means for following to a predetermined position with respect to said member, in response to displacement of said means for following from said position, thereby to tend to maintain said position; and means responsive to said means for moving said means for following, for producing a signal representative of the instantaneous axial position of said member on the circumference of said drum.

17. In a dead time simulator apparatus for storing signals for a time interval comprising a drum; a belt engaging a portion of the circumference of said drum; a flexible member; means for placing said member between said belt and said drum; means responsive to input signals for moving said means for placing in a path parallel to the axis of said drum and immediately adjacent to the circumference of said drum, whereby said member is placed between said belt and said drum at a position that is representative of the instantaneous value of such input signals; means adjacent said drum disposed circumferentially away from said means for placing, for following the position of said member where the latter is disposed between said belt and said drum; and means responsive to said means for following, for producing a signal representative of the instantaneous axial position of said member on the circumference of said drum.

18. In a dead time simulator apparatus for storing signals for a time interval comprising a drum; a belt engaging a portion of the circumference of said drum; a flexible continuous member; means, responsive to input signals, for moving said means for placing in a path parallel to the axis of said drum and immediately adjacent to the circumference of said drum, whereby said member is placed between said belt and said drum at a position that is representative of the instaneous value of such input signals; means adajacent said drum disposed circumferentially away from said means for placing, for coacting with said member where the latter is disposed between said belt and said drum; means for moving said means for following to a predetermined position with respect to such position of said member, in response to displacement of said means for following from said position, thereby to tend to maintain said predetermined position; and means, responsive to said means for moving said means for following, for producing a signal representative of the instantaneous axial position of said member on the circumference of said drum.

19. Apparatus for storing signals comprising, a centerless drum; a belt engaging a portion of the circumference of said drum; means for maintaining tension in said belt and for supporting said drum in centerless fashion; a flexible member; and means for placing said member between said belt and said drum at a position relative to the axis of said drum that is representative of an instantaneous value of the signal stored.

20. A dead time simulator comprising a drum; a belt engaging a portion of the circumference of said drum; a flexible member; means engaging a portion of said member for placing another portion of said member between said drum and said belt at different points between the ends of said drum; means, for coacting with said member as placed between said belt and said drum at said different points, disposed adjacent said drum at a place around said drum circumferentially away from said means for placing.

References Cited in the file of this patent

UNITED STATES PATENTS

| 963,091 | Sundh | July 5, 1910 |
| 2,559,733 | Pitman et al. | July 10, 1951 |
| 2,675,818 | Gallo et al. | Apr. 20, 1954 |
| 2,875,734 | Winters et al. | Mar. 13, 1959 |

FOREIGN PATENTS

| 503,530 | Belgium | June 15, 1951 |